US005556237A

United States Patent [19]
Rexius

[11] Patent Number: 5,556,237
[45] Date of Patent: Sep. 17, 1996

[54] APPARATUS AND METHOD FOR DISPENSING AND DISTRIBUTING LOOSE PARTICULATE MATERIALS

[75] Inventor: Arlen L. Rexius, Eugene, Oreg.

[73] Assignee: Rexius Forest By-Products, Inc., Eugene, Oreg.

[21] Appl. No.: 319,494

[22] Filed: Oct. 7, 1994

[51] Int. Cl.$^6$ ................................................. B65G 53/08
[52] U.S. Cl. ............................ 406/32; 406/39; 406/48; 406/56; 406/65; 406/79; 406/164; 222/252; 414/523; 414/526
[58] Field of Search ........................... 406/11, 31, 32, 406/39, 48, 56, 60, 65, 79, 121, 122, 135, 164; 198/662, 670; 414/526, 528, 523, 323, 326; 222/252, 236, 254

[56] References Cited

U.S. PATENT DOCUMENTS

| | | | |
|---|---|---|---|
| 1,792,590 | 2/1931 | Kirk | 406/48 |
| 1,928,859 | 10/1933 | Kutscha | 414/528 |
| 2,497,295 | 2/1950 | Cavllier | 198/670 |
| 2,694,496 | 11/1954 | Atkinson | 406/65 |
| 2,715,972 | 8/1955 | Grygiel | 414/523 |
| 2,791,339 | 5/1957 | Sprague | 414/523 |
| 2,988,368 | 6/1961 | Kerr | 414/528 |
| 3,602,394 | 8/1971 | McCune | 406/135 |
| 3,602,404 | 8/1971 | Frank | 222/252 |
| 3,679,082 | 7/1972 | Gramlich | 406/56 |
| 4,249,838 | 2/1981 | Harvey et al. | 406/56 |
| 4,717,308 | 1/1988 | Kuhns | 414/307 |
| 4,773,960 | 9/1988 | Vincelli et al. | 406/48 |
| 5,181,804 | 1/1993 | Wysong et al. | 406/56 |

FOREIGN PATENT DOCUMENTS

| | | | |
|---|---|---|---|
| 251169 | 5/1963 | Australia | 414/526 |
| 829422 | 1/1952 | Germany | 222/252 |
| 166233 | 10/1982 | Japan | 414/326 |
| 256419 | 10/1989 | Japan | 198/662 |
| 178596 | 3/1966 | U.S.S.R. | 222/236 |

Primary Examiner—Gary C. Hoge
Attorney, Agent, or Firm—Christensen O'Connor Johnson & Kindness PLLC

[57] ABSTRACT

A truck including a container used to transport and dispense loose particulate materials. A moving floor is located on the floor of the container to move loose particulate materials within the container into a feeder and dispensing system. The container includes two opposing augers mounted on the inner surface of a rear door of the container. The augers feed loose particulate material within the container to a mixer. The mixer helps to break up the loose particulate material to keep it from bridging as it drops into a feeder. The feeder regulates the flow of loose particulate material into a mixing chamber. A high volume air blower is connected to the mixing chamber. The blower forces a high volume of air through the mixing chamber and out of the mixing chamber into an attached hose. As loose particulate material drops into the mixing chamber, it mixes with the air flow and is blown out of the attached hose. Prior to entering the mixing chamber, the air stream from the blower may be mixed with water to produce a mist. The water mixed with the air stream mixes with the loose particulate material, helping to prevent the production of airborne particles.

19 Claims, 9 Drawing Sheets

APPARATUS AND METHOD FOR DISPENSING AND DISTRIBUTING LOOSE PARTICULATE MATERIALS

FIELD OF THE INVENTION

The present invention relates to methods and apparatus for dispensing and distributing loose particulate or non-free-flowing materials including wood by-products and compost.

BACKGROUND OF THE INVENTION

A number of industries, including the forest by-products, landscaping, and playground industries have long been in need of efficient methods and apparatus for transporting, dispensing and distributing non-free-flowing or loose particulate materials. An exemplary but non-exclusive list of commonly distributed non-free-flowing or loose particulate materials includes loose bark, wood chips, sawdust, compost, etc. Applications for such materials include residential and commercial landscaping and playground installations.

As society recognizes the increased need to improve the safety of playgrounds, it is increasingly important to cover areas surrounding playground equipment with a cushioning material. Such materials cushion a child's fall thus reducing the occurrence of injuries. Some of the commonly used playground cushioning materials include loose bark, wood chips, sawdust, rubber particles, etc.

In the past, it has been difficult to safely and efficiently transport and apply loose particulate materials to the application site. Loose particulate materials are generally trucked on site in a dump truck, unloaded and then distributed manually using wheelbarrows, shovels, rakes, etc. To increase the efficiency of the distribution process, the present inventor invented a container truck to transport and distribute loose particulate materials. The container truck includes an open top through which the truck can be filled using a front-end loader or other loading equipment. The container truck includes a moving floor or conveyor. The moving floor moves loose particulate material within the container into a material feeder at the rear of the container. The material feeder provides a regulated flow of loose particulate material into an air stream from a powerful blower. Loose particulate material exiting the feeder mixes with the air stream from the blower and is blown out of the container through an attached hose. An operator applies loose particulate material by pointing the free end of the hose at the location, where the loose particulate material is desired.

Although the inventor's previous invention dramatically increases the efficiency of the dispensing and distribution process, it has room for further improvements. The moving floor sometimes moves loose particulate material over the feeder so that it "bridges," e.g., blocks the passageway to the feeder, thus preventing material from entering the feeder. An operator must then enter the container truck to break up the loose particulate material so that it falls into the feeder.

In order to prevent bridging or blocking of the feeder, a second operator is located within the container to redistribute or break up the loose particulate material. However, placing an operator within the container is undesirous because the operator is located adjacent to dangerous equipment including the moving floor and feeder. In addition to increasing the possibility of injury, the use of two operators adds to overall distribution costs.

Another concern identified during the operation of the container truck was the production of a great deal of airborne particles. Blowing dry loose particulate materials such as wood chips or sawdust creates a large quantity of airborne particles or dust. The airborne particles create an unpleasant working environment for the operator and people within the vicinity of the application process. In addition, the Environmental Protection Agency (EPA) is investigating whether airborne particles present health concerns for operators or bystanders. The EPA has urged the industry to research methods to distribute dry loose particulate materials without creating large quantities of airborne particles.

Thus, a need exists in the industry for methods and apparatus to distribute loose particulate materials that reduce or eliminate some of the problems of prior distribution systems. The present invention is directed towards fulfilling some of these needs.

SUMMARY OF THE INVENTION

The present invention is an apparatus and method for dispensing and distributing loose particulate material, such as fill material. In one embodiment, the apparatus includes a container for holding and transporting the loose particulate material to the place of application. A feeder regulates the flow of loose particulate material out of the container. The feeder is provided loose particulate material by one or more rotatable, vertically-oriented augers located above the feeder. A drive system operatively attached to the augers rotates them in order to feed loose particulate material to the feeder. Loose particulate material exiting the feeder is blown out of the apparatus through a hose by an air stream produced by a blower.

In accordance with other aspects of the invention, two opposing augers are located on either side of the feeder. Each auger includes an inclined portion that inclines downward and inward toward the feeder. A vertically-oriented mixer is located directly above the feeder between the two augers.

In accordance with yet other aspects of the invention, water is provided to the air stream from the blower. The water mixes with the air stream and the loose particulate material exiting the feeder.

In accordance with still other aspects of the invention, the rotation of the augers and amount of loose particulate material provided to the augers is controlled by a control system. The control system senses the amount of resistance to movement of the augers produced by the loose particulate material. If there is no resistance, the control system moves additional loose particulate material into contact with the augers using a moving floor. If the resistance is greater than a predetermined amount, the control system shuts off the supply of particulate material. The control system also moves loose particulate material away from the feeder by reversing the rotation of the auger when the resistance is greater than a predetermined level. The control system may also include a photoelectric, sonar, or other type of sensor to detect the amount of loose particulate material being provided to the augers.

The present invention provides an efficient and safe way of dispensing and distributing loose particulate material. The invention's use of a moving floor, augers and a mixer helps to ensure that the proper amount of loose particulate material is provided to the feeder. Thus, the use of the present invention helps to reduce particulate material bridging over or blocking the feeder. The use of the moving floor, augers and mixer of the present invention addresses the safety concerns by removing the need for a second operator within the container. Elimination of the second operator also helps to reduce operation costs. In addition, the present invention more completely empties the interior of the container of loose particulate material.

Figure 2:
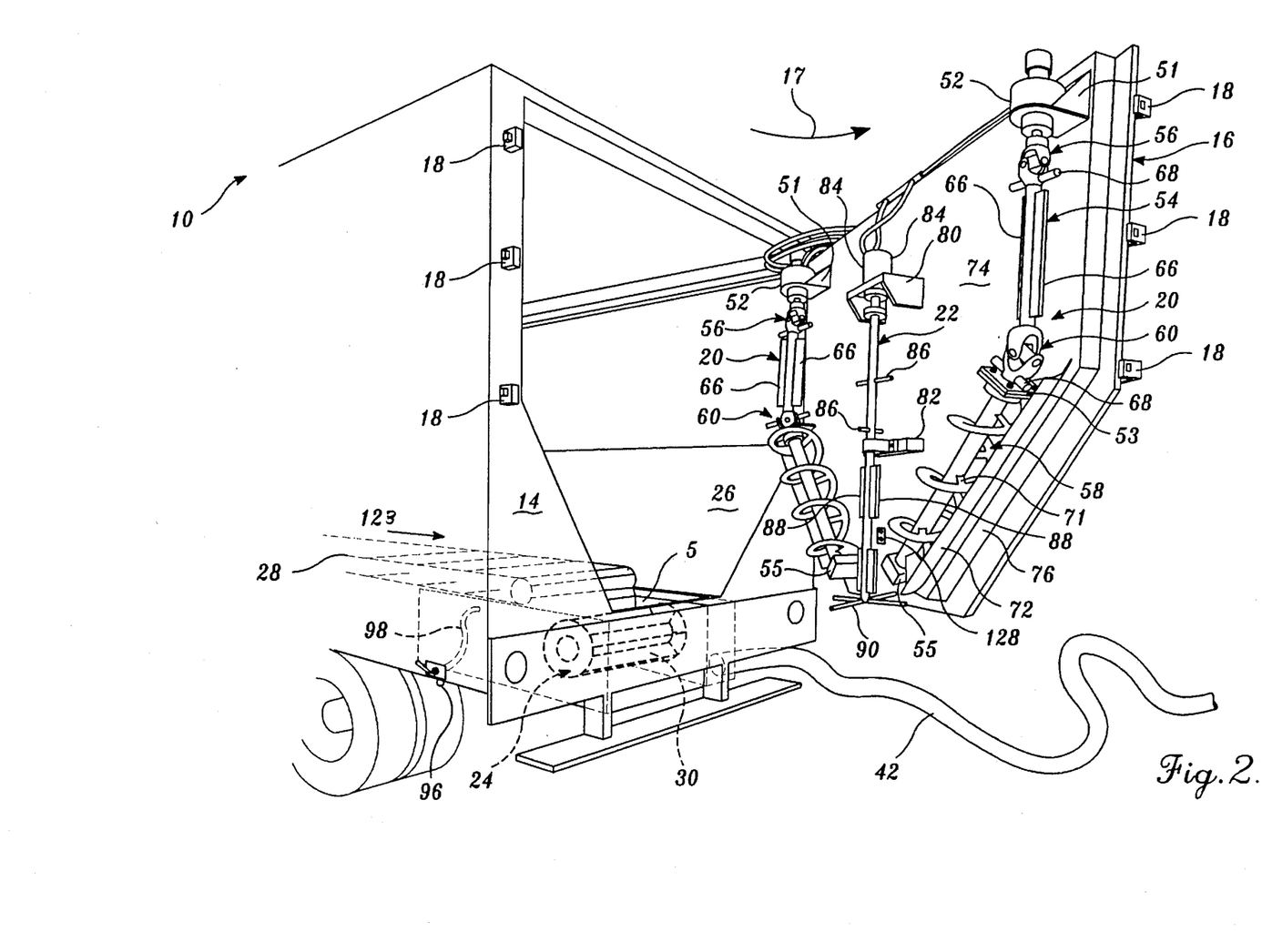
Figure 9:
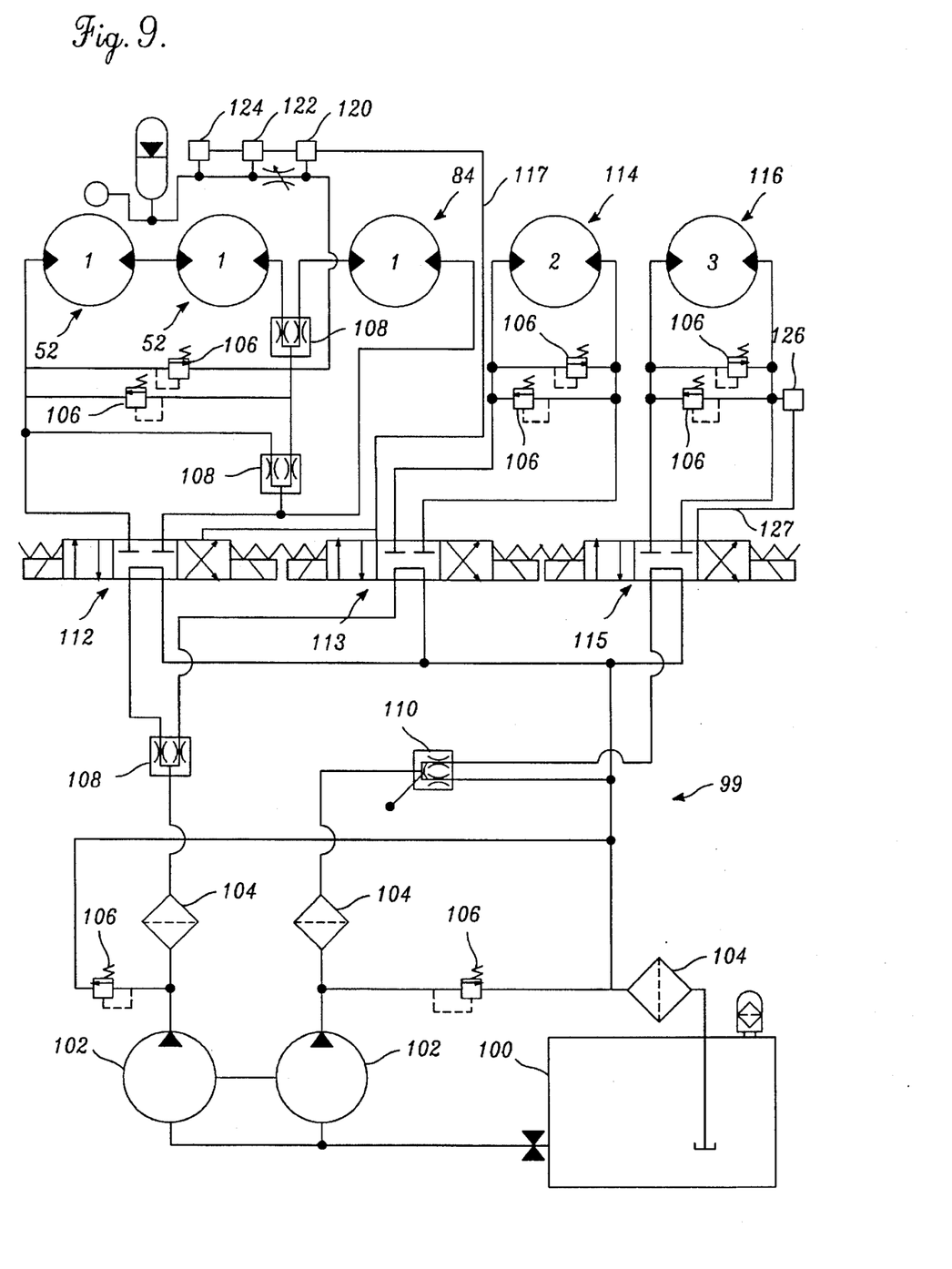

The invention's injection of water into the air stream blowing the loose particulate material is also advantageous. The water mixes with the air stream and the loose particulate material, helping to reduce the amount of airborne particles produced. Thus, the present invention produces a more pleasant working environment for the operator.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 1 is a perspective view of a container truck, attached hose and operator distributing loose particulate material in accordance with the present invention;

FIG. 2 is a perspective view of the rear portion of the container truck of FIG. 1 illustrating the augers, mixer and feeder;

FIG. 3 is an enlarged, perspective view of a portion of one of the augers of FIG. 2;

FIG. 4 is a cross section of the lower section of one of the augers of FIG. 2;

FIG. 5 is a side, partial cutaway view of the container truck illustrating the blower and feeder mechanism;

FIG. 6 is a rear, partial cutaway view of the container truck illustrating the blower and feeder mechanism;

FIG. 7 is a top plan view of the remote transmitter for controlling the blower and feeder mechanism;

FIG. 8 is a top plan view of the local control panel for controlling the blower and feeder mechanism; and FIG. 9 is a hydraulic schematic of the hydraulic control system of the container truck of FIG. 1.

DETAILED DESCRIPTION OF THE PREFERRED EMBODIMENT

A container truck 10 including a dispensing and distributing apparatus formed in accordance with the present invention is illustrated in FIG. 1. The container truck includes a trailer or material container 12. The container 12 may be part of the truck 10 or it may be a detachable trailer. The container 12 is preferably a five-sided box having an open top or roof through which loose particulate material may be loaded using a from-end loader or other appropriate loading equipment. The container 12 includes a door 16 that takes up a large portion of the rear wall 14 of the truck. The door 16 is hinged on one side so that it may swing open in an arc away from the rear wall of the truck as shown by arrow 17 (FIG. 2). The opposite side of the door 16 is releasably fastened to the rear of the truck using a plurality of locking fasteners 18.

Two opposing augers 20 and a centrally located mixer 22 are rotatably mounted on the inner surface 74 of the door 16. A cylindrical feeder 24 is rotatably mounted beneath an inclined floor 26 of the container 12 directly beneath the mixer 22. When the door 16 is closed and locked, the augers 20 and mixer 22 are positioned to feed loose particulate material within the container 12 into the cylindrical feeder 24. The loose particulate material within the container 12 is also fed to the feeder 24, augers 20 and mixer 22 by a moving floor or conveyor 28 located at the bottom of the floor 26.

The feeder 24 includes a plurality of radially extending longitudinal walls forming individual divided chambers 30 spaced around its circumference (FIGS. 2 and 5). As the feeder rotates, the chambers 30 drop a predetermined quantity of loose particulate material from the container 12 into the top of a mixing chamber 32 (FIGS. 5 and 6) located directly beneath the feeder 24. One side of the mixing chamber 32 is connected to a blower 34 by ducting 36 while the opposite side is connected to a hose 42.

As described in detail below, during operation, the blower 34 forces a large volume of high velocity air through the ducting 36. As the air flows through the ducting 36, water is preferably injected into the air stream through a water nozzle 40 extending into the air stream. The water atomizes upon contact with the air stream, forming a mist. The resulting moist air stream enters one side of the cavity 32, and mixes with loose particulate material dropped into the top of the cavity 32 by the feeder 24. The combined stream of air, water and loose particulate material exits the chamber 32 through a hose 42 connected to the opposite side of the chamber (FIG. 6). The loose particulate material is blown through the length of the hose 42 and exits at a free end 44 that is manipulated by an operator 46 (FIG. 1). Upon exiting the hose 42, the loose particulate material settles upon the location at which the operator 46 points the free end 44 of the hose.

The operator 46 controls the flow of loose particulate material through the hose 42 using either a local control panel 48 (FIG. 1) mounted on the side of the container 12 or a remote transmitter control panel 50. Both control panels 48 and 50 allow the operator to control the speed of the blower 34 and feeder 24 to increase or decrease the volume of loose particulate material being applied.

The individual parts and operation of the present invention will now be discussed in greater detail. As discussed above, the interior of the container 12 is filled by loading loose particulate material into the top of the container using a front-end loader or other loading equipment. As loose particulate material is dispensed from the rear of the container, additional loose particulate material is transported from the front of the container to the rear of the container by the moving floor.

As best seen in FIG. 2, the moving floor or conveyor 28 is mounted on the floor of the container centered between the inclined sides of the floor 26, commonly referred to as a V-bottom container. The inclined sides of the floor 26 slope upward from the opposing edges of the moving floor 28 until they contact the vertical sides of the container. The rear end of the moving floor terminates adjacent the forward edge of an opening 57 in the floor of the container.

The moving floor or conveyor 28 moves the load of particulate matter within the container forward or rearward within the container in response to a hydraulic control system 99 (FIG. 9). The moving floor 28 may be a continuous belt conveyor or other types of conveyors known to those of ordinary skill in the art. In the preferred embodiment, the moving floor 28 includes 12-inch overlapping belt sections that are bolted to two opposing edge drive chains and a center drive chain.

The moving floor's movement is controlled by a hydraulic control system 99 (FIG. 9) as described below. The moving floor 28 may be started or stopped using either of the local or remote control panels 48 and 50. The moving floor's movement may also be controlled automatically by a hydraulic or electric load sensing system as discussed below.

When loose particulate material transported by the moving floor 28 reaches the rear end of the moving floor 28 it is moved into contact with the opposing augers 20 and mixer 22 (FIG. 2). Each auger 20 is rotatably attached to the inner surface 74 of the door 16 by an upper bracket 51, a central bracket 53, and a lower bracket 55. Each auger 20 is rotatably driven by a hydraulic motor 52 that is attached to the upper bracket 51. Each hydraulic motor 52 rotates the augers in response to inputs from the hydraulic control system (FIG. 9). The preferred embodiment rotates the augers between 10 and 20 RPMs; however, other speeds could be used, depending upon the application.

Each hydraulic motor 52 is attached to a straight shaft 54 of the respective auger by a first universal joint 56 (FIG. 2). Each straight shaft 54 extends downward from the hydraulic motor 52 parallel to the edge of the door 16. The opposite end of each straight shaft 54 is attached to an inclined shaft 58 by a second universal joint 60. The inclined shaft 58 extends downward parallel to the inclined edge 76 of the door 16. The upper and lower ends of the inclined shaft 58 are rotatably mounted to the inner surface 74 of the door using bearings in the L-shaped central bracket 53 and the lower bracket 55, respectively.

Figure 3:
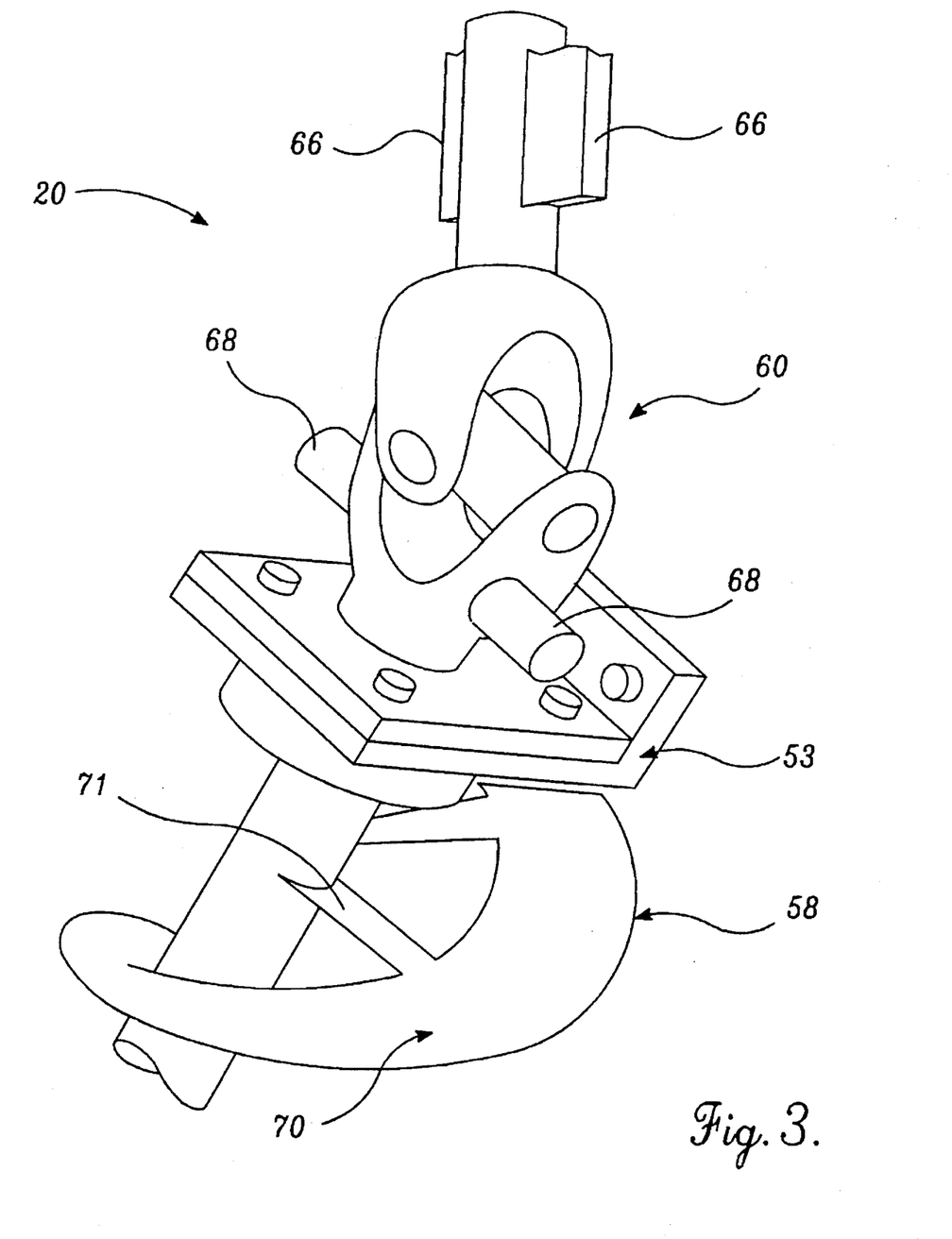

The augers 20 are used to break up and feed loose particulate material within the container to the mixer 22 and feeder 24. To assist in breaking up the loose particulate material, each straight shaft 54 includes two opposing radially extending paddles 66. In addition, both universal joints 56 and 60 include radially extending opposing rods 68 (FIGS. 2 and 3).

Figure 4:
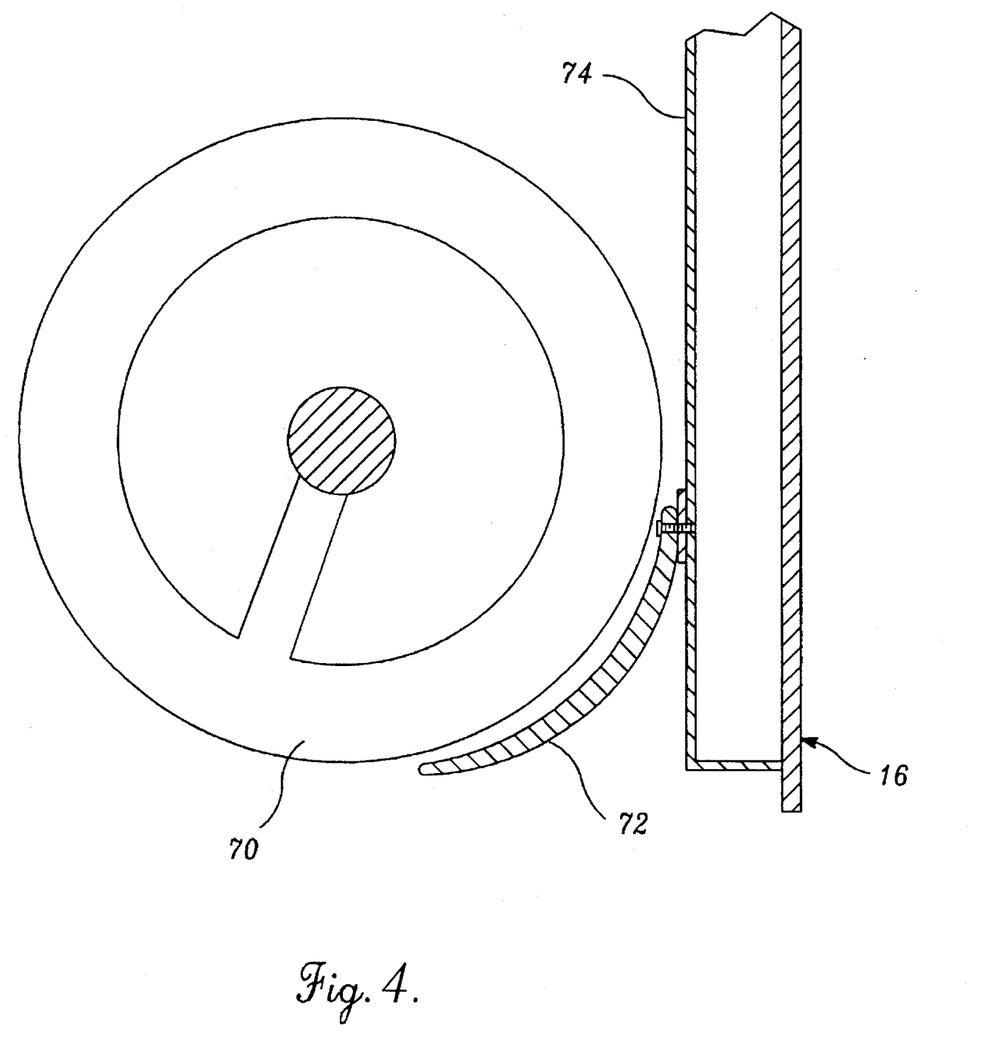

Each inclined shaft 58 includes a ramp 70 (FIG. 3) that spirals downward over the length of the shaft. Each ramp 70 is spaced radially outward from the surface of the shaft 58 by a plurality of radial arms 71. As the augers 20 rotate, the ramps 70 carry loose particulate material downward along the inclined floor 26 into the opening 54. Preferably, flange 72 (FIGS. 2 and 4) is mounted outboard of the ramp 70 parallel to the inclined edge 76 to prevent loose particulate material from being forced into gaps between the edge of the door 16 and the rear wall 14 of the container. The flange 72 is bolted or otherwise fastened to the inner surface 74 and curves outward approximately parallel to the cylindrical surface established by the circumference of the ramp 70.

As loose particulate material is fed into the opening 54, it passes through the mixer 22. The mixer 22 is centered between the two augers 20 and rotatably attached to the inner surface of the door 16 by bearings located at its upper end in a bracket 80 and at its mid-span in a bracket 82. The mixer 22 is rotatably driven by a hydraulic motor 84 attached to its upper end. The hydraulic motor 84 rotates the mixer 22 in response to inputs from a hydraulic control system 99 (FIG. 9). A plurality of rods 86 (FIG. 2) and paddles 88 extend radially outward from the center of the mixer 22 to assist in breaking up loose particulate material within the container 12. The lower end of the mixer 22 terminates at two perpendicular, radially extending mixing rods 90. The mixing rods 90 are located directly above the opening 54 in the floor when the door 16 is closed and fastened.

As loose particulate material is moved rearward by the moving floor 28, it is broken up and directed into the mixing rods 90 by the augers 20 and moving floor 28. The mixing rods 90 help to break up and loosen the loose particulate material as it is forced through the opening 54 by the augers, thus avoiding "bridging" of the fill material over the opening of the feeder. The broken up loose particulate material is funneled downward into the individual chambers 30 of the feeder 24 by ducting 92.

The ducting 92 is sized to feed loose particulate material into the chambers 30 while preventing loose particulate material from falling between the feeder 24 and the ducting into the mixing chamber 32. The ducting 92 and feeder 24 form an air lock between the mixing chamber 32 and the interior of the container 12. The air lock prevents air being blown through the mixing chamber 32 from blowing upward through the feeder and into the interior of the container.

Figure 5:
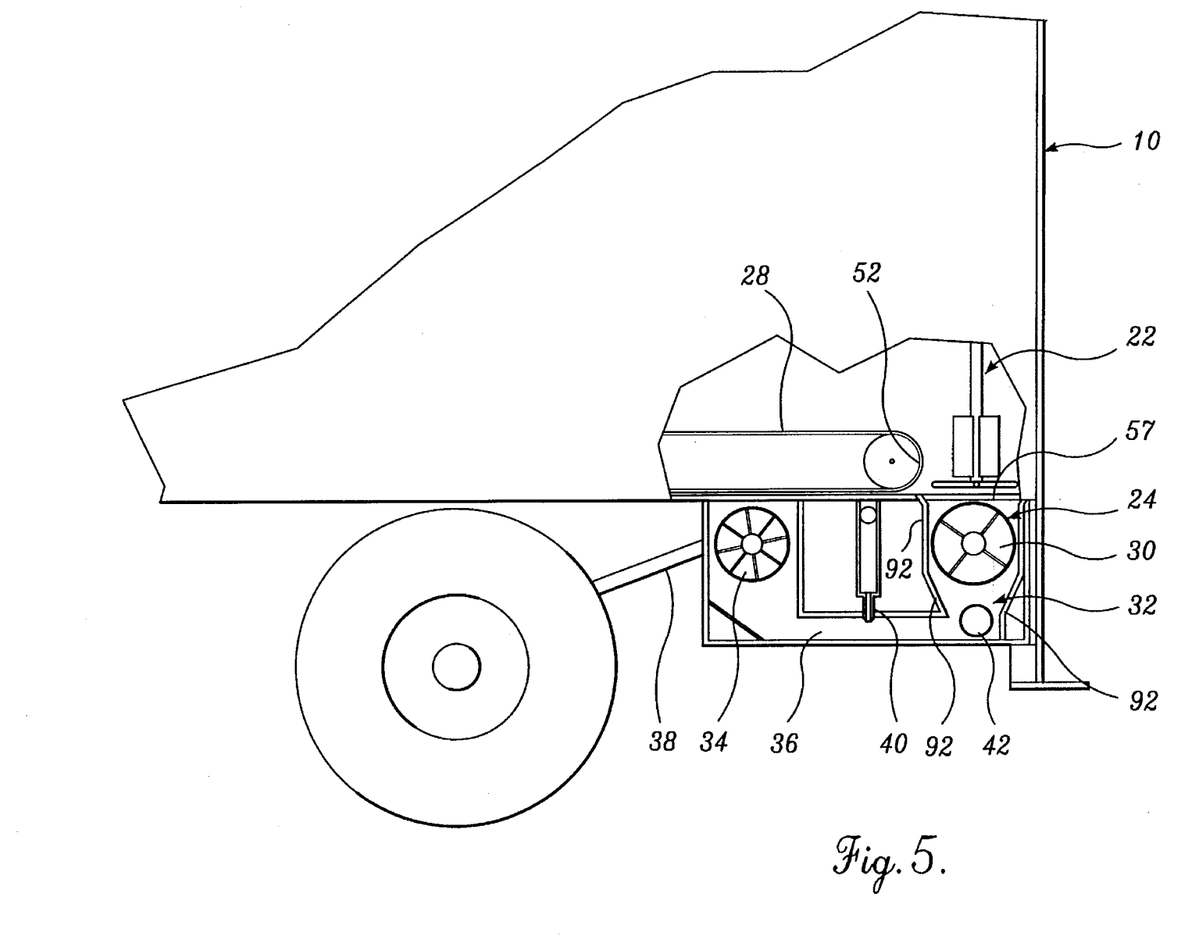
Figure 6:
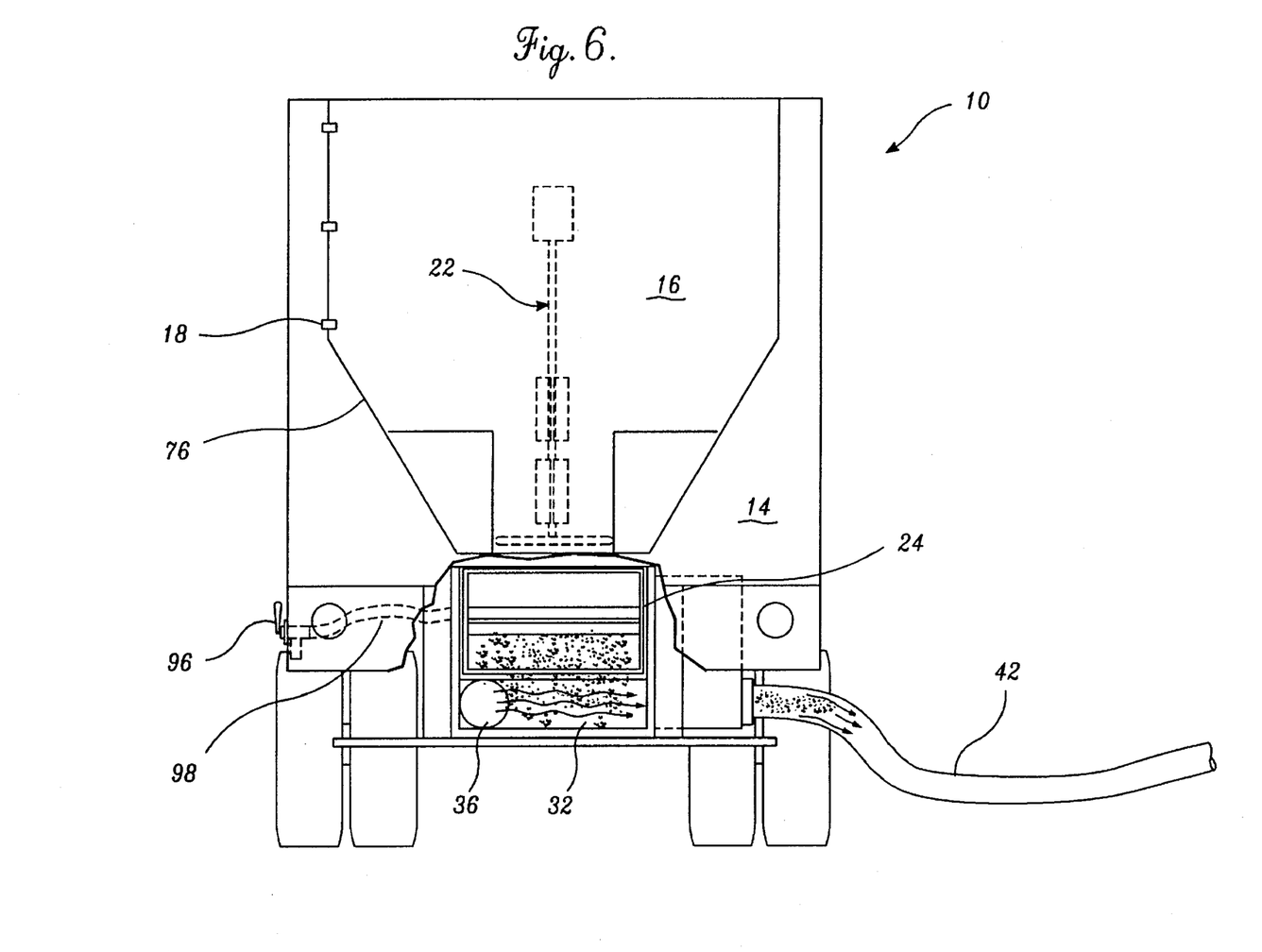

The feeder 24 is rotatably mounted within the ducting 92 and is driven by a hydraulic motor (not shown) controlled by the hydraulic control system 99 (FIG. 9). As the feeder 24 is rotated, loose particulate material within each chamber 30 is rotated downward until it falls into the top of the mixing chamber 32 (FIGS. 5 and 6). As the feeder 24 feeds loose particulate material into the top of the mixing chamber 32, the blower 34 forces a high speed stream of air into one side of the mixing chamber through ducting 36.

The blower 34 may be any type of blower capable of producing high speed air flow. The blower 34 may be driven by a power takeoff 38 from the truck's engine or may be driven by a separate drive mechanism (not shown). As the blower provides a high speed air stream through the ducting 36, in a preferred embodiment water is introduced into the air stream by the water nozzle 40 (FIG. 5). The water nozzle 40 is connected to an external water valve 96 (FIG. 2) by a hose 98.

Figure 1:
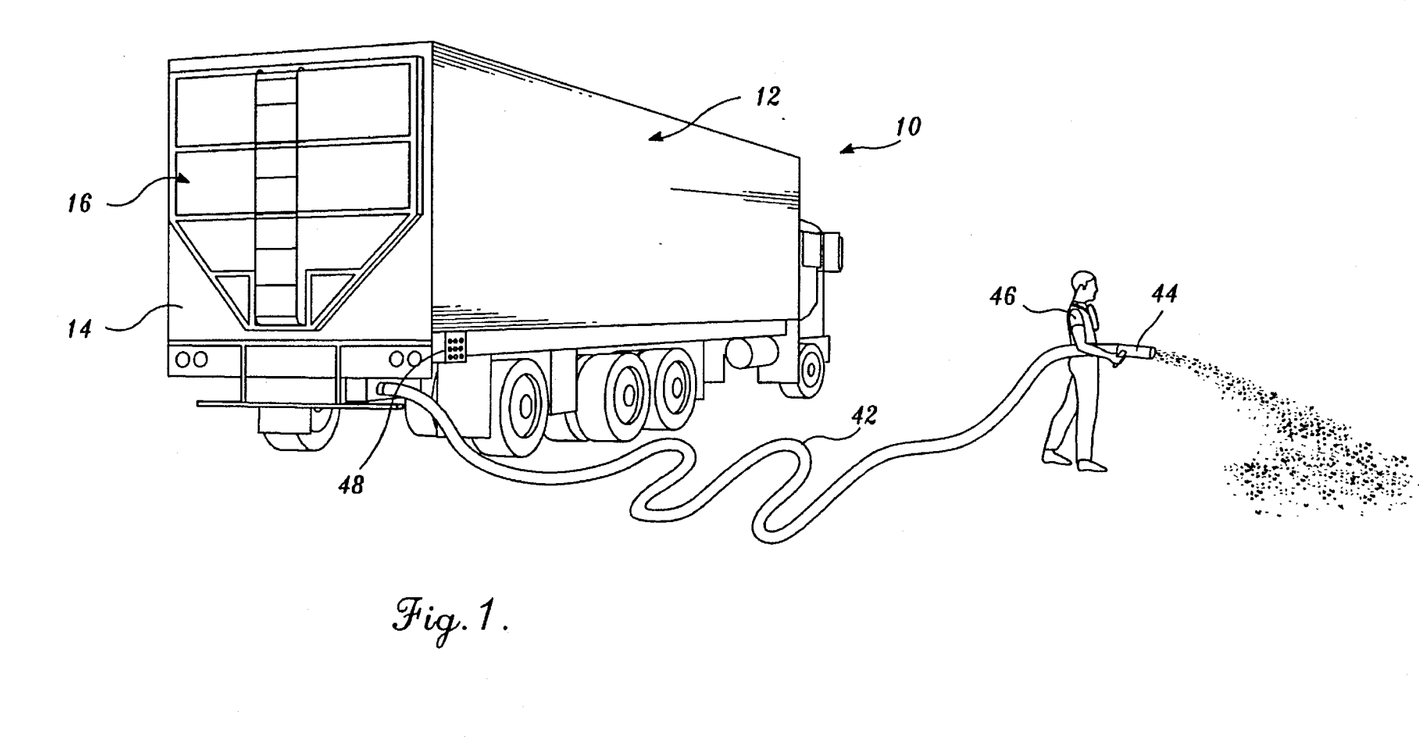

During operation, the water valve 96 is connected to a water supply through the use of a hose (not shown). The water flows through the water valve 96, hose 98 and nozzle 40 into the air stream produced by the blower 34. As the water exits the nozzle 40, it is atomized by the air stream flowing through the ducting 36, producing a mist. The resulting water laden air stream flows into one side of the mixing chamber 32 (FIGS. 5 and 6). As the air stream enters the mixing chamber, it mixes with the loose particulate material entering the top of the mixing chamber. The water within the air stream mixes with the loose particulate material reducing the amount of loose dust or particles produced by the high velocity air stream contacting the loose particulate material. The loose particulate material is then blown out the opposite side of the mixing chamber 32 into the hose 42 (FIG. 6). The air stream produced by the blower blows the loose particulate material through the length of the hose 42 until it exits the free end 44 (FIG. 1). As illustrated in FIG. 1, an operator 46 may manipulate the free end 44 of the hose in order to place loose particulate material wherever desired.

Figure 7:
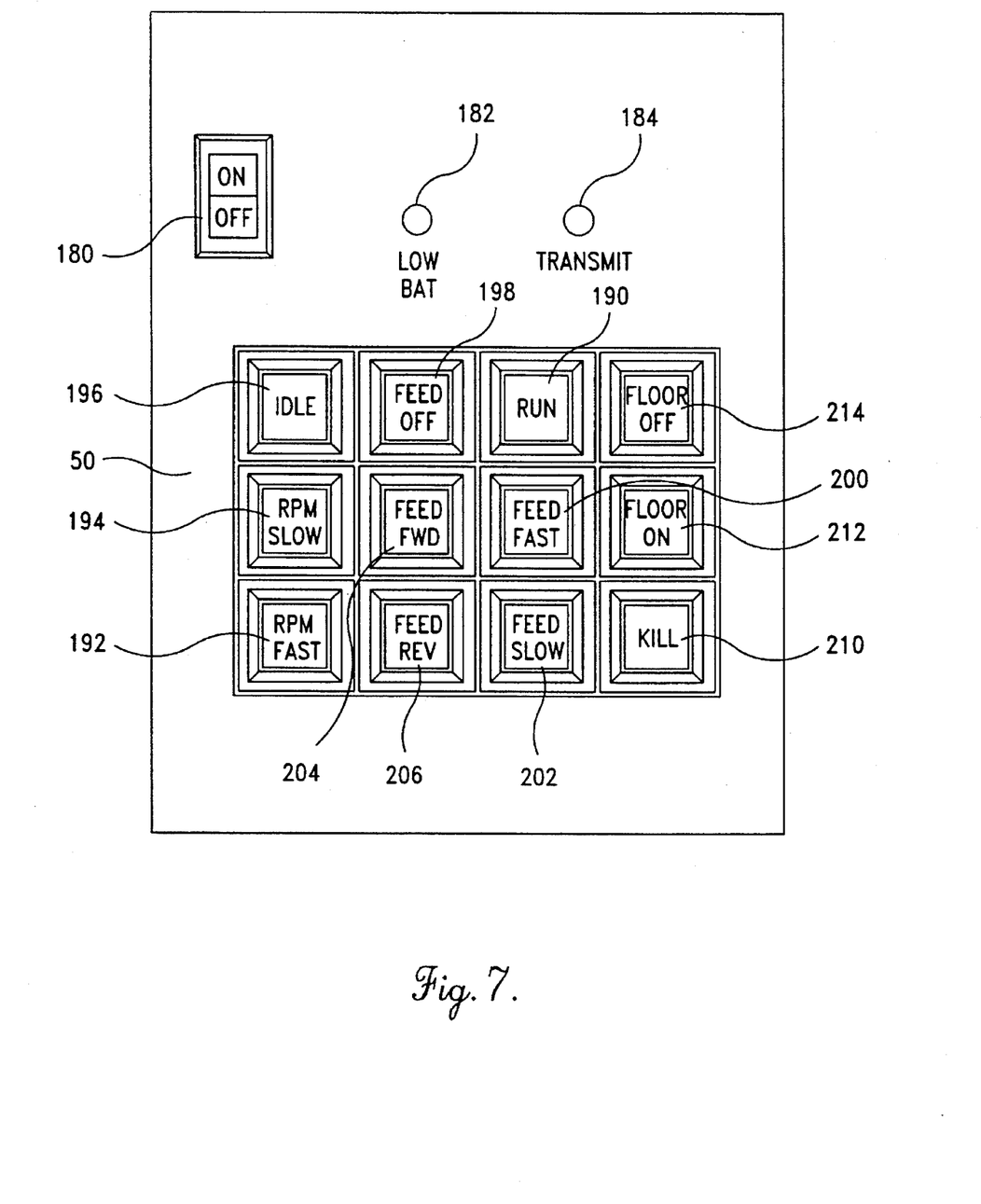

The operation of the container truck is controlled by the operator using either the local control panel 48 (FIG. 8) or the remote transmitter control panel 50 (FIG. 7). Using the control panels 48 or 50, the operator may control the operation of the truck's hydraulic control system 99 illustrated in FIG. 9. The hydraulic control system 99 includes a central hydraulic fluid reservoir 100, two fluid pumps 102, appropriate high pressure filters 104, constant pressure valves 106, flow dividers 108, and flow control valves 110, 112, 113, and 115 as illustrated in FIG. 9 and as understood by those of ordinary skill in the art. The hydraulic control system controls the operation of the hydraulic motors 52 (FIGS. 2 and 9) operating the augers 20 and the hydraulic motor 84 operating the mixer 22. The hydraulic control system also controls the hydraulic motor 114 that operates the moving floor 28 and the hydraulic control motor 116 that operates the feeder 24.

The hydraulic control system includes a first pressure sensor 120, a second pressure sensor 122, and a third pressure sensor 124. The sensors 120, 122 and 124 are electrically hard wired into the control valves 112 and 113 that control the operation of the motor driving the moving floor 28, augers 20, and mixer 22 by wiring 117. The first pressure switch 120 senses when there is a low hydraulic pressure in the hydraulic control loop driving the augers 20 and mixer 22. Such a low hydraulic pressure is present when the augers 20 and mixer 22 are free-wheeling or moving only a small quantity of loose particulate material within the container. Under such circumstances, the low pressure sensor 120 sends a signal to the control valve 113, instructing the valve to open, thus starting the hydraulic motor 114. When the hydraulic motor 114 starts, the moving floor 28 moves clockwise as illustrated by arrow 122 (FIG. 2). This moves additional loose particulate material within the container into contact with the augers 20 and mixer 22.

As loose particulate material moves into contact with the augers 20 and mixer 22, resistance to the movement of the augers and mixer increases, thus increasing the hydraulic pressure in the system driving the motors 52 and 84. When the hydraulic pressure reaches a predetermined level, the second pressure sensor 122 is triggered. Triggering the second pressure switch 122 provides a signal to the control valve 113 instructing the valve to close, thus stopping the movement of the moving floor 28.

If too large a quantity of loose particulate material is provided to the augers 20 and mixer 22 it is possible that the augers or mixer could jam. In such circumstances, a sufficiently large hydraulic pressure is developed within the hydraulic system to trigger the third pressure sensor 124. Triggering the third pressure sensor 124 sends a signal to the control valve 112 instructing it to reverse the direction of movement of the hydraulic motors 52 and 84. Reversing the augers 20 and mixer 22 moves loose particulate material away from the feeder 24, thus helping to relieve the jammed condition.

The hydraulic control system 99 also includes a fourth pressure sensor 126 which is used to help prevent stalling or jamming of the hydraulic motor 116 that operates the feeder 24. When the hydraulic pressure reaches a predetermined condition, representative of excessive resistance to movement of the motor 116, the fourth pressure sensor 126 is triggered. This sends an electrical signal to the valve 115 controlling the motor 116 via an electrical cable 127. The signal instructs the valve 115 to either close or reverse the rotation of the motor 116, thus helping to relieve the jammed condition.

Alternative embodiments of the present invention could replace or supplement the hydraulic pressure sensors 120, 122, 124 and 126 with a photoelectric sonar or other type of sensor 128 (FIG. 2). In the alternate embodiments, the photoelectric or other type of sensor 128 is used detect the level of loose particulate material at the rear of the container using light, sound, etc., depending on the type of sensor. The sensor 128 thus provides an indication of the amount of loose particulate material fed into the augers. This indication is used to control the operation of the moving floor 28 to ensure that the proper amount of loose particulate material is being fed into the augers 20 and mixer 22.

An operator controls the operation of the hydraulic control system 99 and the truck's engine RPM using either the local control panel 48 or remote transmitter control panel 50. The hydraulic control system in turn controls the augers 20, mixer 22, moving floor 28 and feeder 24 as described above.

Figure 8:
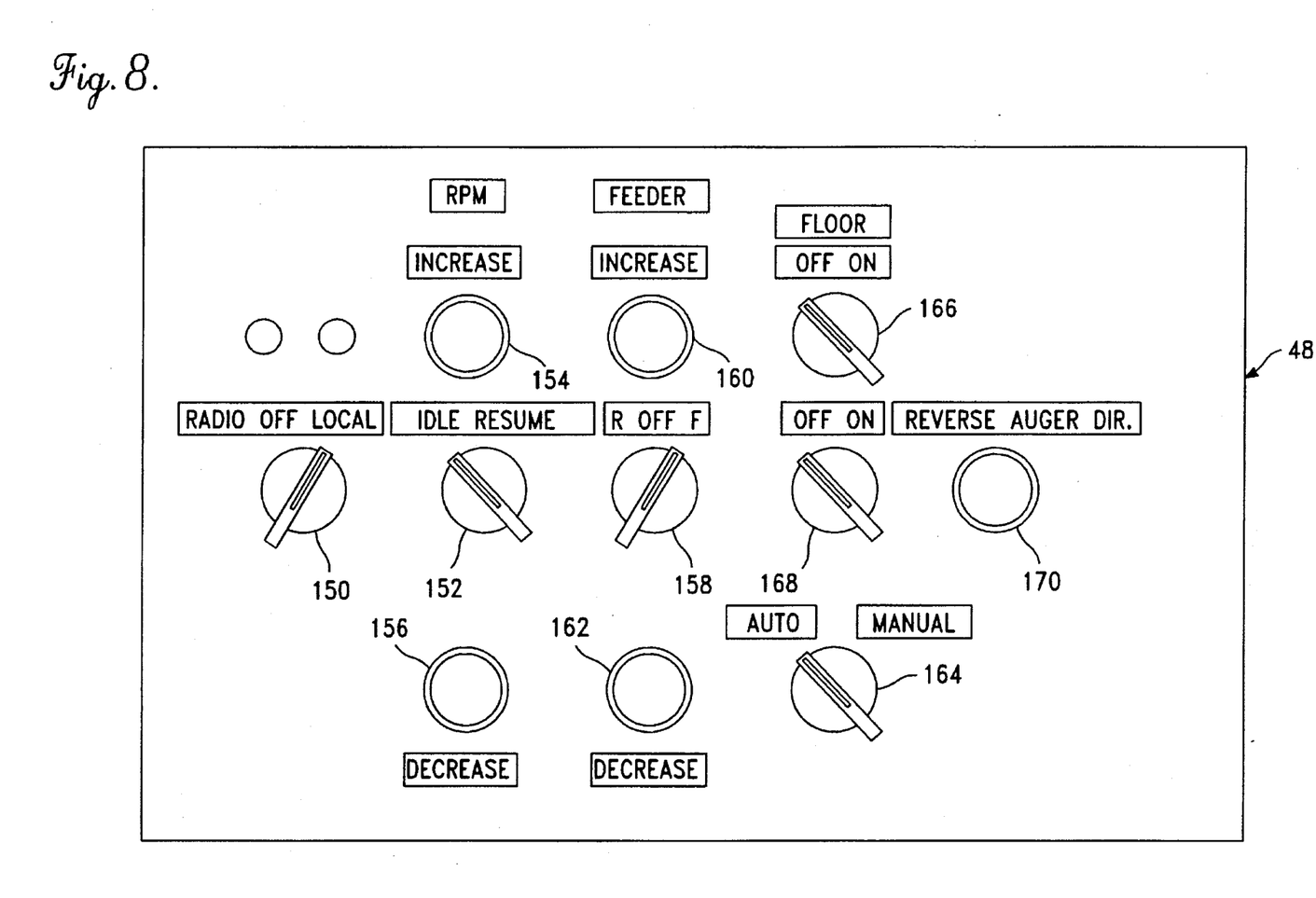

The pumps 102 of the hydraulic control system are operated by a power takeoff from the truck's engine. Therefore, the truck's engine must be left running during operation. The operator selects whether to control the operation of the truck using the local or remote control panels 48 or 50 by rotating a switch 150 on the local control panel 48 (FIG. 8). "LOCAL" selects the local control panel 48 while "RADIO" selects the remote control panel 50.

The operator instructs the truck's engine to operate at "idle" or at a memorized RPM by selecting either "IDLE" or "RESUME" using switch 152. The RPM of the engine is increased or decreased by depressing buttons 154 or 156, respectively, on the control panel. The blower 34 is driven by a power takeoff from the engine, so increasing or decreasing the engine's RPM increases or decreases the speed at which the blower operates. As the speed of the blower 34 increases or decreases, the movement of air through the mixing chamber 32 increases or decreases. This in turn increases or decreases the distance that loose particulate material travels upon exiting the free end 44 of the hose 42. The volume of the air stream produced will vary, depending upon the application, however, an 800–1000 CFM volume blower has been found to produce advantageous results.

The feeder 24 is turned off, rotated forward or rotated in reverse by selecting "OFF," "F," or "R," respectively using switch 158. The speed at which the feeder rotates is increased or decreased by depressing buttons 160 or 162, respectively. Increasing or decreasing the speed of the feeder 24 increases or decreases the amount of loose particulate material fed into the mixing chamber 32 and exiting through the hose 44. Changing the direction of rotation of the feeder 24 helps to clear loose particulate material that becomes jammed within the feeder.

The moving floor 28 is operated either manually or automatically by making the appropriate selection using switch 164. If the "MANUAL" option is selected, the floor or moving floor 28 is turned on or off using switch 166. If "AUTO" is selected, the sensors 120 and 122 control the movement of the moving floor 28 as described above.

The augers 20 and mixer 22 are turned on or off using switch 168. The direction of the rotation of the augers 20 may be reversed by depressing switch 170. Reversing the direction of the augers 20 helps to clear loose particulate material from the feeder.

If the operator chooses to operate the truck using the remote control panel 50, switch 150 (FIG. 8) is set to "RADIO". The operator must also place the moving floor 28 in the automatic or manual mode using switch 164. The control panel 50 is switched on by depressing button 180 (FIG. 7). The control panel 50 includes a low battery indicator 182 and a transmit indicator 184.

The augers 20 and mixer 22 are turned on by depressing switch 168. The blower 34 is started by depressing the run key 190. The operator increases or decreases the RPM of the engine and blower by depressing keys 192 or 194, respectively. The engine may also be set at an idle position in which the blower is shut down by depressing key 196. The moving floor 28 is turned on or off by depressing keys 212 or 214, respectively. Rotation of the feeder 24 is started by depressing key 198. The speed of the feeder 24 is increased or decreased by depressing keys 200 or 202, respectively. The direction of rotation of the feeder 24 is changed between forward and reverse by depressing keys 204 or 206, respectively. The operation of the truck including the moving floor 28, augers 20, mixer 22, feeder 24, blower 34 and truck's engine may be stopped by depressing a kill switch 210.

When operating with either the local or remote control panels 48 or 50, it is advantageous that a water supply be attached to the water valve 96 and the water valve 96 be opened. Whenever the blower 34 and feeder 24 are operating, the control system instructs an electric solenoid water valve (not shown) operatively connected between the water valve 96 and the nozzle 40 to open. This allows water to flow through the nozzle 40 into the air stream produced by the blower 34. When the blower 34 and feeder 24 are turned off, the control system automatically shuts off the solenoid water valve.

Generally, an operator turns on the augers 20, mixer 22, blower 34, sets the operation of the moving floor 28 to automatic, and attaches a water supply to the water valve 96. The operator adjusts the flow of the loose particulate material through the hose 42 by adjusting both the speed of the blower 34 and the speed of the feeder 24. Thus, the operator is able to adjust both the amount of loose particulate material exiting the free end of the hose and the distance of the loose particulate material.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. An apparatus for dispensing and distributing loose particulate material, the apparatus comprising:
    a container for holding and transporting the loose particulate material;
    a feeder that regulates the flow of loose particulate material out of the container;
    one or more rotatable vertically oriented augurs located above the feeder to move loose particulate material into the feeder;
    a drive system operatively attached to the augers to rotate the augers;
    a blower that produces an air stream that blows loose particulate material exiting the feeder through a hose coupled to the apparatus; and
    a moving floor located within the container to move the loose particulate material into the feeder and augers.

2. The apparatus of claim 1, further comprising a water nozzle located to provide a stream of water to mix with the air stream and the loose particulate material exiting the feeder.

3. The apparatus of claim 1, further comprising a vertically oriented mixer located directly above the feeder.

4. The apparatus of claim 1, further comprising two augers located on opposite sides of the feeder.

5. The apparatus of claim 1, wherein each auger includes an inclined portion that inclines downward and inward toward the feeder.

6. The apparatus of claim 1, wherein each auger includes a spiraling ramp spaced radially outward from the center of the auger.

7. The apparatus of claim 1, wherein each auger includes one or more paddles extending radially outward from the center of the auger.

8. The apparatus of claim 1, further comprising control means for controlling the rotation of the augers in response to the amount of resistance to movement of the augers produced by the loose particulate material.

9. The apparatus of claim 8, wherein the control means includes a hydraulic control system and one or more pressure sensors triggered by changes in the hydraulic pressure in the hydraulic control system.

10. The apparatus of claim 1, further comprising means for controlling the rotation of the augers in response to an amount of loose particulate material being provided to the augers.

11. The apparatus of claim 10, wherein the drive system includes a sensor that provides an indication of the amount of loose particulate material adjacent the augers.

12. An apparatus for dispensing and distributing loose particulate materials, the apparatus comprising:
    a container for holding the loose particulate material, the container including a movable floor that moves loose particulate material within the container into a feeder that regulates the flow of loose particulate material out of the container;
    one or more rotatable vertically oriented augers located above the feeder to move loose particulate material into the feeder;
    a drive system attached to the augers to rotate the augers to feed the loose particulate material into the feeder;
    a blower that produces an air stream that blows loose particulate material exiting the feeder through a hose coupled to the apparatus;
    control means for controlling the moveable floor and augers to provide a steady supply of loose particulate material to the feeder; and
    a water nozzle located to provide a stream of water to mix with the air stream and the loose particulate material exiting the feeder.

13. The apparatus of claim 12, wherein the augers are located on opposite sides of the feeder and wherein each auger includes an inclined portion that inclines downward and inward to provide loose particulate material to the feeder.

14. The apparatus of claim 12, wherein the control means controls the rotation of the augers in response to an increasing resistance to the rotation of the augers produced by the loose particulate material.

15. A method for dispensing and distributing loose particulate material, comprising the steps of:
    feeding loose particulate material from a container into a feeder using a moving floor and one or more vertically oriented augers;
    controlling the movement of the moving floor and augers in response to the amount of resistance to rotational movement of the augers produced by the loose particulate material;
    regulating the flow of loose particulate material into an air stream produced by a blower using the feeder; and
    blowing loose particulate material exiting the feeder through an attached hose.

16. The method of claim 15, further comprising the step of providing a stream of water to mix with the air stream produced by the blower and the loose particulate material exiting the feeder.

17. The method of claim 15, further comprising the step of mixing the loose particulate material provided to the feeder using a mixer.

18. The method of claim 15, wherein the controlling step further comprises sensing a hydraulic pressure within a hydraulic control system controlling the augers.

19. The method of claim 15, further comprising the step of determining the amount of loose particulate material being provided to the augers using a photoelectric eye.

* * * * *